United States Patent
Simon et al.

(10) Patent No.: US 9,914,356 B2
(45) Date of Patent: Mar. 13, 2018

(54) HYDROSTATIC TRANSMISSION WITH SPOOL VALVE DRIVEN MOTOR

(71) Applicant: Parker-Hannifin Corporation, Cleveland, OH (US)

(72) Inventors: Matthew Herman Simon, Paw Paw, MI (US); David Mark Heathcoat, Jr., Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 345 days.

(21) Appl. No.: 14/686,255

(22) Filed: Apr. 14, 2015

(65) Prior Publication Data
US 2015/0323051 A1 Nov. 12, 2015

Related U.S. Application Data

(60) Provisional application No. 61/989,808, filed on May 7, 2014.

(51) Int. Cl.
*B60K 17/10* (2006.01)
*F16H 39/42* (2006.01)
(Continued)

(52) U.S. Cl.
CPC ............ *B60K 17/105* (2013.01); *B60K 17/10* (2013.01); *B60K 17/356* (2013.01);
(Continued)

(58) Field of Classification Search
CPC .... B60K 17/10; B60K 17/105; B60K 17/356; B60Y 2200/223; F15B 7/06;
(Continued)

(56) References Cited

U.S. PATENT DOCUMENTS 4,613,292 A † 9/1986 Bernstrom
6,783,339 B2 † 8/2004 Dong
(Continued)

OTHER PUBLICATIONS

Orbit Power, Hydraulics for Industry, from Char-Lynn, Catalog 11-809-30, 1970, pp. 1-15 and 44-47.†

*Primary Examiner* — Logan Kraft
(74) *Attorney, Agent, or Firm* — Renner, Otto, Boisselle & Sklar, LLP

(57) ABSTRACT

A center section/motor sub-assembly for use in a hydrostatic transmission includes a center section having a pump running face for interfacing with a pump and a motor running face for interfacing with a motor, and a bore extending laterally through the center section from the motor running face. A spool valve is received in the bore and includes a fluid pathway for providing fluid communication between the pump running face and the motor running face. The sub-assembly further includes a motor having a rotor and a motor stator secured to the center section adjacent to the motor running face in a manner that permits rotation of the rotor. The center section is configured for the hydraulic separating forces of the motor to be reacted only into the center section. A hydrostatic transmission includes the sub-assembly enclosed by a housing, in combination with a pump and output shaft.

20 Claims, 11 Drawing Sheets

(51) Int. Cl.
*F16H 61/4035* (2010.01)
*B60K 17/356* (2006.01)
*F15B 13/02* (2006.01)

(52) U.S. Cl.
CPC ........... *F15B 13/025* (2013.01); *F16H 39/42* (2013.01); *F16H 61/4035* (2013.01); *B60Y 2200/223* (2013.01)

(58) Field of Classification Search
CPC .... F15B 13/025; F16H 39/42; F16H 60/4035; F16H 61/4035
See application file for complete search history.

(56) References Cited

U.S. PATENT DOCUMENTS

| | | | |
|---|---|---|---|
| 6,874,320 B2 * | 4/2005 | Sakikawa | B60K 17/105 60/484 |
| 9,163,724 B1 * | 10/2015 | Langenfeld | F16H 63/3026 |
| 2003/0070429 A1 † | 4/2003 | Jolliff | |
| 2011/0192158 A1 † | 8/2011 | Simon | |

\* cited by examiner
† cited by third party

HYDROSTATIC TRANSMISSION WITH SPOOL VALVE DRIVEN MOTOR

RELATED APPLICATION DATA

This application claims priority to U.S. Provisional Patent Application Ser. No. 61/989,808, filed on May 7, 2014, the content of which is incorporated here by reference.

FIELD OF INVENTION

The present invention relates generally to hydraulic pumps and motors, and more particularly to a hydrostatic transmission having a pump, a rotary spool valve incorporated as part of a motor, and a center section that provides a fluid connection between the pump and motor for the flow of hydraulic fluid.

BACKGROUND

A prime mover, such as an internal combustion engine or the like, can be connected to a hydrostatic transmission to drive a wheel in a light vehicle. A hydrostatic transmission is particularly suitable to provide traction drive for light vehicles such as turf machines, lawn tractors, ride-on lawn mowers, and like devices. A simple usage of hydrostatic transmissions is on zero-turn radius vehicles, including zero-turn radius mowers and tractors.

Generally, a hydrostatic transmission includes a hydraulic pump and a hydraulic motor. The hydraulic pump usually is a piston-type pump including a plurality of reciprocating pistons, which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above.

In certain vehicle configurations, the hydrostatic transmission may be configured for full wheel torque by connecting the hydrostatic transmission output directly to a wheel hub without any intervening gear reduction element. Specifically, a pump is driven by the prime mover (engine). The motor typically is of larger displacement (e.g., 20:1) as compared to the pump, which provides speed reduction and torque amplification of the prime mover to drive the wheel. Spool valve driven motors are known in the art for use in various applications, but conventional configurations have proven to be deficient for wheel drives, and hence have not been practical for transmission applications. In conventional spool valve/motor configurations, the spool valve and output shaft are integral components. Side loads on the wheel hub require outboard and inboard bearings. Because the spool valve bore normally serves as the inboard bearing, large side loads may be transferred to the spool valve resulting in significant wearing of the spool valve bore. To accommodate such loads and otherwise provide suitable performance, it remains difficult to provide a compact spool valve motor configuration that is suitable for hydrostatic transmissions applied to light vehicle wheel drives. Accordingly, because of the size constraints associated with light vehicles, it has been difficult to provide a hydrostatic transmission for a full wheel torque configuration that is compact, cost effective, and easy to assemble.

SUMMARY OF INVENTION

A need exists for an improved hydrostatic transmission that overcomes one or more of the above deficiencies of conventional configurations. The hydrostatic transmission of the present invention includes an enhanced center section/motor sub-assembly with an enhanced center section. The center section receives a spool valve that includes fluid pathways for fluid communication between a pump and motor in both supply flow and return flow directions. With such configuration, the spool valve directly engages with the center section on the pump side, which results in a more compact configuration as compared to conventional configurations. The described configuration also prevents large side loads on the wheel hub from being transferred to the spool valve, thereby reducing the wear as compared to conventional configurations. The present invention, therefore, is practical for transmission applications for which conventional configurations have been unsuitable.

An aspect of the invention, therefore, is a center section/motor sub-assembly for use in a hydrostatic transmission. In exemplary embodiments, the sub-assembly includes a center section having a pump running face for interfacing with a pump and a motor running face for interfacing with a motor, and a bore extending laterally through the center section from the motor running face. The pump running face is oriented 90° relative to the motor running face. A spool valve is received in the bore and includes fluid pathways for providing fluid communication between the pump running face and the motor running face. The sub-assembly further includes a motor having a motor stator and a rotor, wherein the motor stator is secured to the center section adjacent to the motor running face in a manner that permits rotation of the rotor. The center section is configured as a porting manifold for communicating hydraulic fluid from the pump running face through the spool valve to the motor, and configured for the hydraulic separating forces of the motor to be reacted only into the center section.

In exemplary embodiments of the sub-assembly, the porting manifold of the center section includes first and second kidney ports on the pump running face for interfacing with the pump, first and second internal fluid ports in fluid communication with the bore, and first and second internal passages that form fluid pathways respectively between the first and second kidney ports and the first and second internal fluid ports. The spool valve includes a first annular recess in fluid communication with the first internal fluid port, a second annular recess in fluid communication with the second internal fluid port, and a plurality of longitudinal slots. Each longitudinal slot is in fluid communication with one of the annular recesses, and the longitudinal slots form fluid pathways for communicating hydraulic fluid between the spool valve and the motor. In this manner, the sub-assembly provides fluid pathways for a supply flow of hydraulic fluid from the pump running face of the center section to the motor, and a return flow from the motor back through the center section.

Another aspect of the invention is a hydrostatic transmission that includes the sub-assembly enclosed by a housing, in combination with a pump and output shaft. The center section and the motor are configured for the hydraulic separating forces of the motor to be reacted only into the center section, and not the top housing. In exemplary embodiments of the hydrostatic transmission, for installation the output shaft is configured as a separate component from the spool valve. The top housing of the hydrostatic transmission may enclose a fluid reservoir. The volume enclosed by the top housing is sufficient to define an internal expansion volume into which the fluid in the reservoir can expand as fluid temperature increases. This eliminates the need for a separate, external expansion tank installed on the hydrostatic transmission or remotely on vehicle as is utilized in conventional configurations. The hydrostatic transmission may be incorporated into light vehicles, such as for example, turf machines, lawn tractors, ride-on lawn mowers, and like devices, including zero-turn radius vehicles, for full wheel torque driving of the vehicle wheels.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
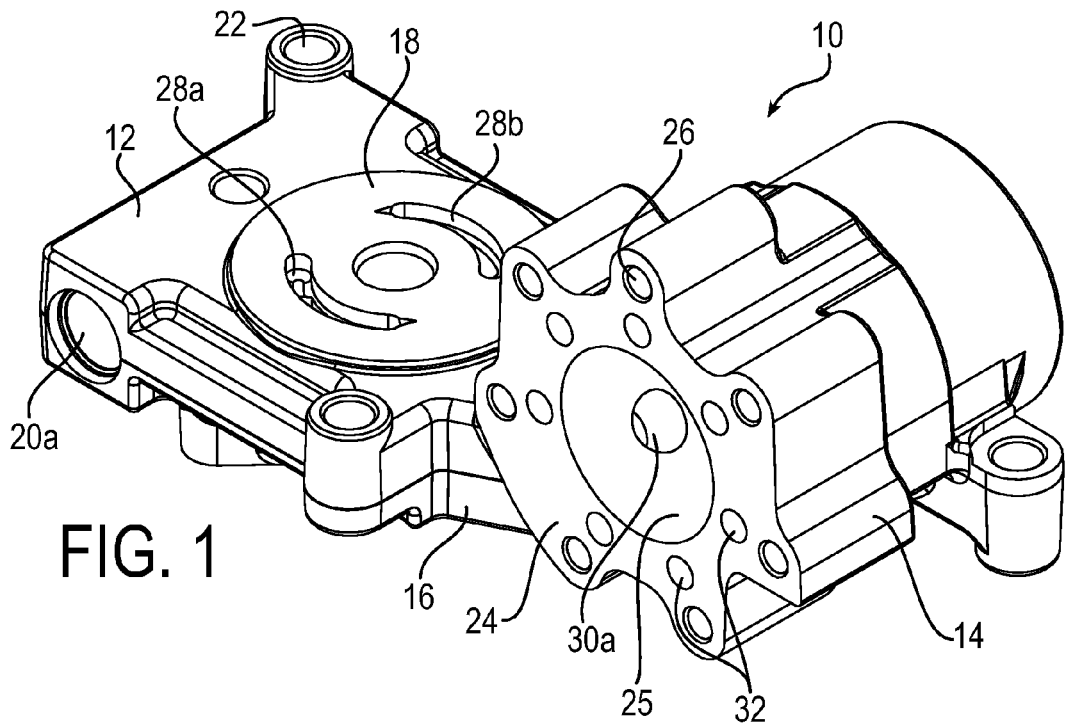
FIG. 1 is a drawing depicting a perspective view of an exemplary center section of a hydrostatic transmission in accordance with embodiments of the present invention.

Embodiments of the present invention will now be described with reference to the drawings, wherein like reference numerals are used to refer to like elements throughout. It will be understood that the figures are not necessarily to scale.

As referenced above, the present invention pertains to vehicle configurations in which a hydrostatic transmission provides for full wheel torque by connecting the hydrostatic transmission output directly to a wheel hub without any intervening gear reduction element. Specifically, a pump is driven by the prime mover (engine). The motor typically is of larger displacement (e.g., 20:1) as compared to the pump, which provides speed reduction and torque amplification of the prime mover to drive the wheel. It will be appreciated by those skilled in art that the hydrostatic transmission and the various components described herein may be reoriented as needed to accommodate different wheels, such as left versus right side wheels, and back versus front wheels. The hydrostatic transmission components otherwise are configured comparably regardless of which wheel is being driven.

As a component of a hydrostatic transmission, an enhanced center section provides a fluid connection between a pump and a motor within the hydrostatic transmission. An aspect of the invention, therefore, is a center section/motor sub-assembly for use in a hydrostatic transmission. In exemplary embodiments, the subassembly includes a center section having a pump running face for interfacing with a pump and a motor running face for interfacing with a motor, and a bore extending laterally through the center section from the motor running face. A spool valve is received in the bore and includes a fluid pathway for providing fluid communication between the pump running face and the motor running face. The sub-assembly further includes a motor having a motor stator and a rotor, wherein the motor stator is secured to the center section adjacent to the motor running face in a manner that permits rotation of the rotor. The center section is configured as a porting manifold for communicating hydraulic fluid from the pump running face through the spool valve to the motor, and configured for the hydraulic separating forces of the motor to be reacted only into the center section.

Figure 2:
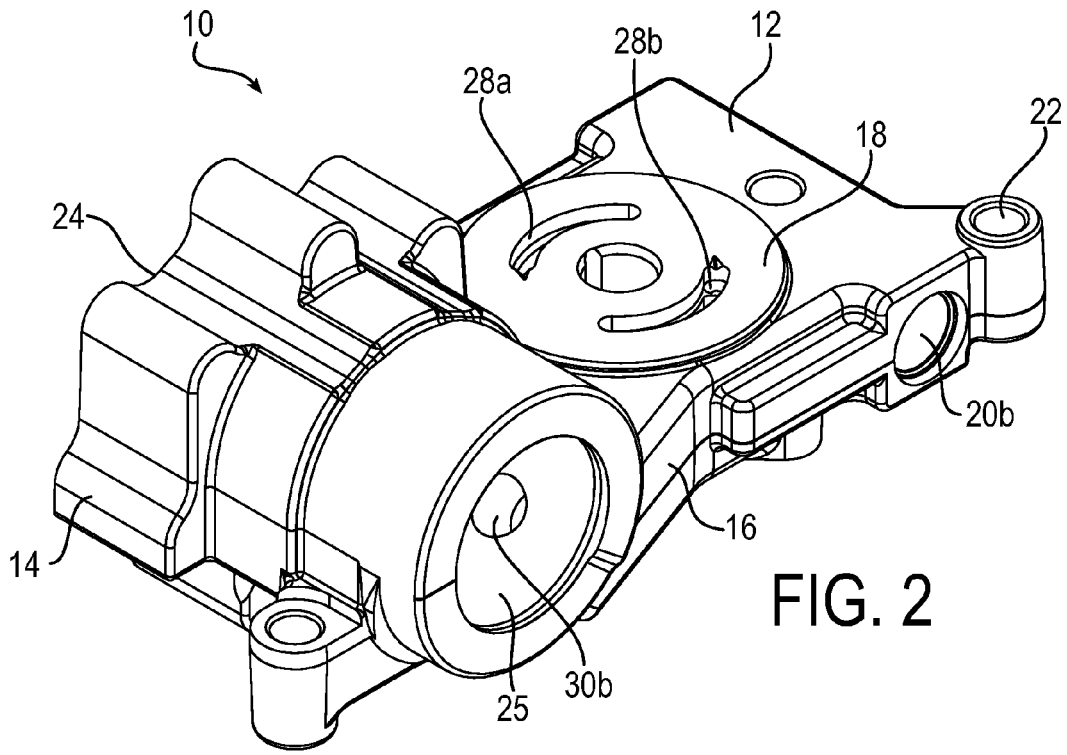
FIG. 2 is a drawing depicting a second perspective view of the exemplary center section, viewed from the opposite side as compared to FIG. 1.

FIGS. 1 and 2 are drawings depicting two perspective views from different viewpoints of an exemplary center section 10 for use in a hydrostatic transmission. The center section 10 includes a pump interfacing portion 12 and a motor connection portion 14. The pump interfacing portion and motor connection portion form a porting manifold 16 including internal passages for communicating hydraulic fluid between a pump and a motor (the pump and motor are not shown in FIGS. 1-2). The pump interfacing portion 12 includes a pump running face 18 that interfaces with the pump components. As further described below, the pump includes a piston-containing barrel that rotates adjacent to the pump running face 18. The pump, therefore, interfaces directly with the center section at the pump running face. Valve cavities 20a and 20b provide for entry of hydraulic fluid into the center section, which is controlled by check valves (not shown in FIGS. 1 and 2) positioned within the valve cavities. Fastening receivers 22 receive fastening elements to secure the center section components within a top housing of the hydrostatic transmission.

The motor connection portion 14 includes a motor running face 24, which acts as an interface between the motor components and the center section. Motor fastening receivers 26 receive fastening elements that secure a motor stator to the center section in a manner that permits the rotation of internal rotor elements of the motor adjacent to the motor running face 24. The center section orients the pump running face 90° relative to the motor running face, and in a manner in which the hydraulic separating forces of the motor are reacted only into the center section, and not into a top housing that encloses the center section and motor. A center section bore hole 25 is provided that extends laterally through the center section, specifically extending laterally from the motor running face 24 through the motor connection portion 14. As described further below, the bore hole 25 is configured to receive a rotary spool valve.

For fluid communication, the porting manifold formed by the center section may be configured as follows. The pump interfacing portion 12 includes first and second kidney ports 28*a* and 28*b* that extend through the pump running face 18 for interfacing with a pump. The pump kidney ports provide a fluid connection with the pump for the entry of hydraulic fluid into the center section. In an exemplary operation of fluid flow, the pump provides fluid flow to port 28*a* for driving the motor in the forward direction (clockwise rotation of the transmission output shaft when looking at the output shaft). The pump provides flow to port 28*b* for driving the motor in the reverse direction (counterclockwise rotation of the transmission output shaft when looking at the output shaft). Commensurately, the motor connection portion 14 includes first and second internal fluid ports 30*a* and 30*b* in fluid communication with the bore 25, that provide fluid paths for communicating fluid into and out from the spool valve when received in the bore 25. A plurality of motor fluid ports 32 extend through the motor connection portion 14, which communicate fluid from the spool valve to the motor as described in detail below.

Figure 3:
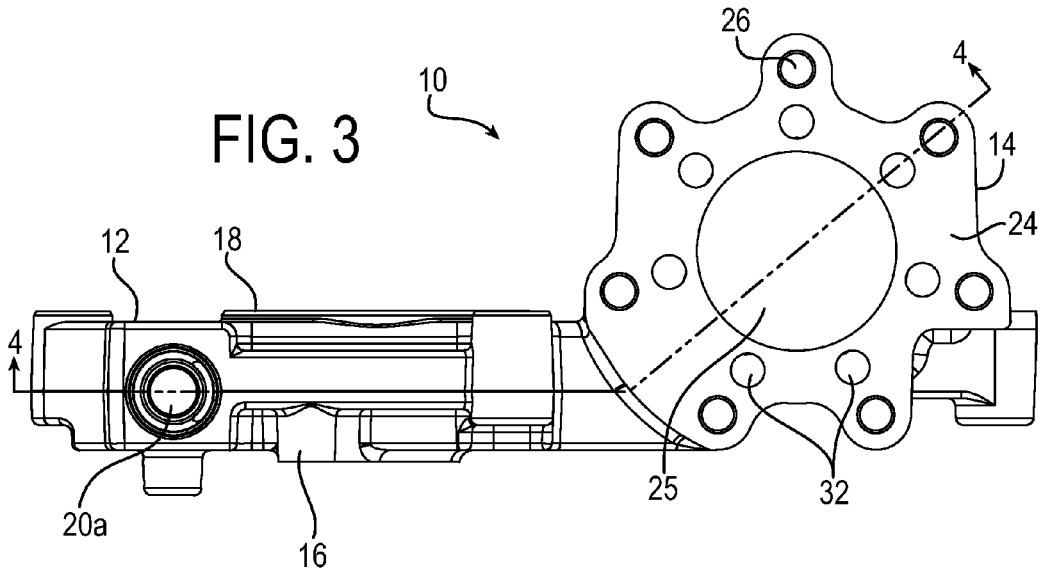
FIG. 3 is a drawing depicting a side view on the motor facing side of the exemplary center section of FIG. 1.
Figure 4:
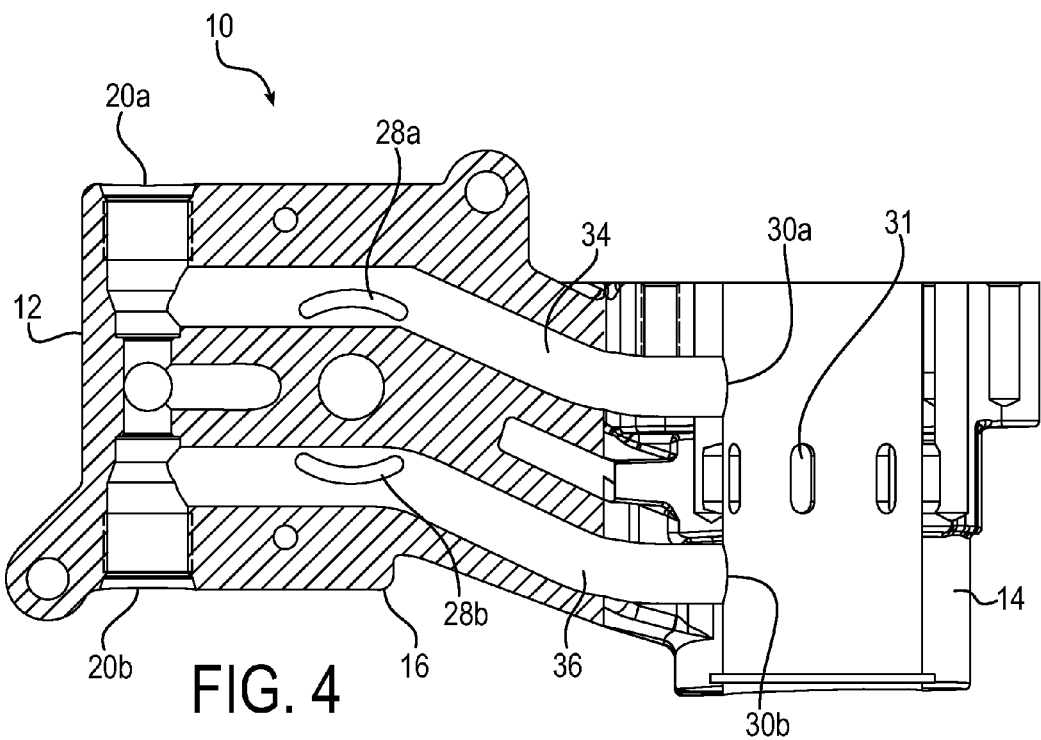
FIG. 4 is a drawing depicting a cross-sectional view of the exemplary center section along the line 4-4 of FIG. 3.

FIG. 3 is a drawing depicting a side view on the motor facing side of the exemplary center section of FIGS. 1 and 2, with like components identified by common reference numerals with respect to FIGS. 1 and 2. FIG. 3 is utilized as a reference figure for generating a cross-sectional view of the center section 10. FIG. 4 is a drawing depicting a cross-sectional view of the center section along the line 4-4 of FIG. 3.

Referring to FIG. 4, the center section 10 includes first and second internal passages 34 and 36 that form fluid pathways for communicating the hydraulic fluid respectively between the first and second pump kidney ports 28*a* and 28*b* and the first and second internal fluid ports 30*a* and 30*b* to provide fluid communication between the pump and the spool valve. The spool valve then provides fluid communication between the internal fluid ports 30*a* and 30*b* and the plurality of motor fluid ports 32 via slots 31. As further shown in FIGS. 3-4, the fluid flow elevation changes as the fluid flows from the pump connection side to the motor connection side. In particular, the internal fluid ports 30*a* and 30*b* are raised slightly above the valve cavities 20*a* and 20*b* and the kidney ports 28*a* and 28*b*, which serves to position the transmission pulley lower in elevation (closer to the output shaft) to improve vehicle installation. As seen particularly in FIG. 4, the internal passages 34 and 36 are configured to run substantially parallel to each other, as they rise in elevation between the pump kidney ports 28*a* and 28*b* and the internal fluid ports 30*a* and 30*b* to the spool valve. The described configuration improves manufacturability of the sand cores used to form the center section casting, and generally renders manufacturing more easy particularly with conventional sand casting processes.

Figure 5:
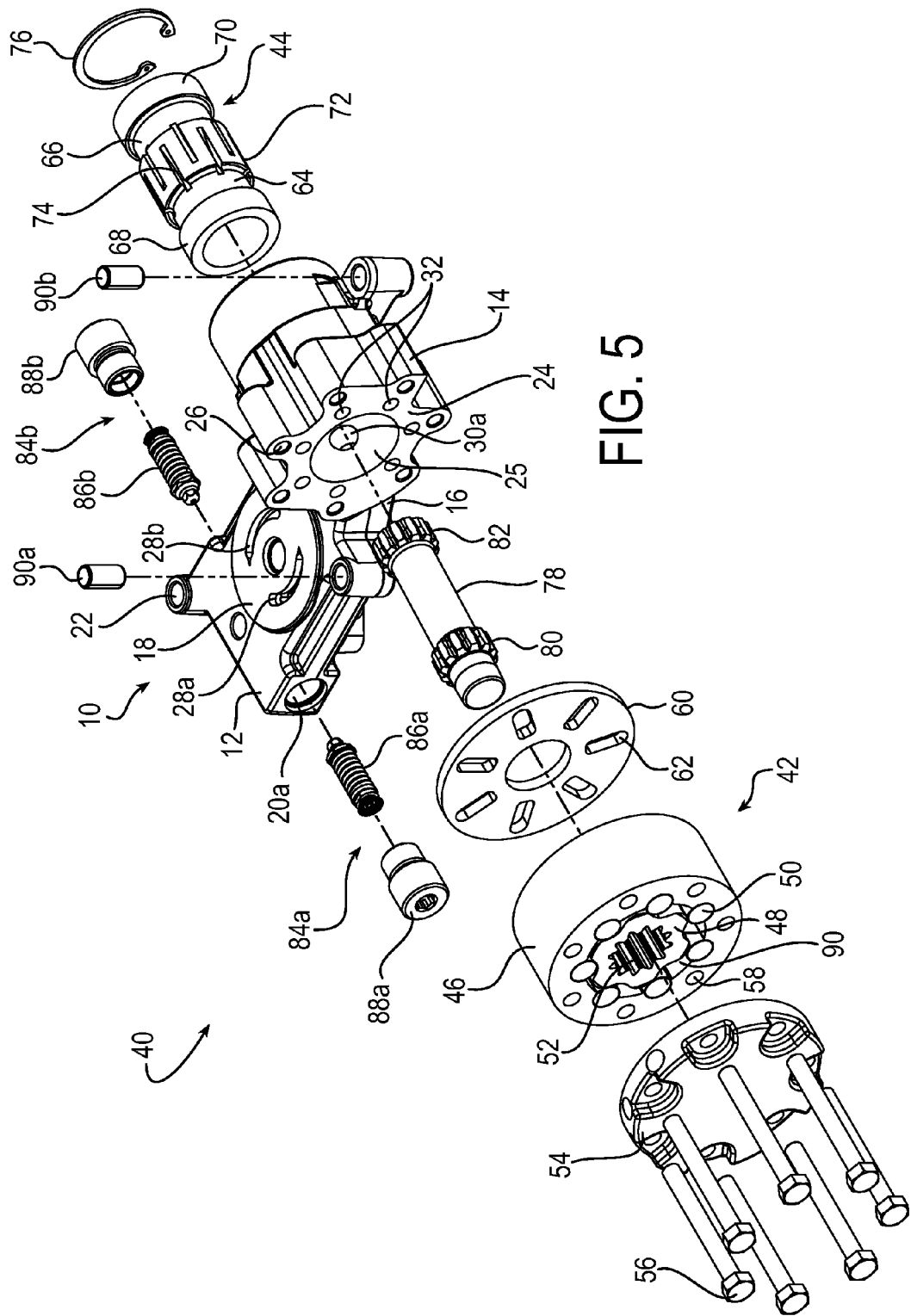
FIG. 5 is a drawing depicting a perspective and exploded view of an exemplary center section/motor portion sub-assembly of a hydrostatic transmission in accordance with embodiments of the present invention.

The center section can be combined with a motor portion and spool valve to form an integrated sub-assembly. In the disclosed configuration, all of the hydraulic separating forces from the motor are directly reacted into the center section 10 only, as opposed to such forces being transferred to the top housing of the transmission and related housing components. FIG. 5 is a drawing depicting a perspective and exploded view of an exemplary center section/motor portion sub-assembly 40 of a hydrostatic transmission. Because the center section/motor portion sub-assembly 40 includes the center section 10 described above, like components of FIG. 5 are numbered the same as in FIGS. 1-4.

Referring to FIG. 5, the sub-assembly 40 includes the center section 10, a motor portion 42, and a rotary spool valve 44. The motor portion 42 has a motor stator 46 that encloses a rotor 48. The motor portion 42 may be a low speed, full wheel torque motor with an orbital gerotor configuration. The orbital gerotor configuration may include the rotor 48 that orbitally rotates against a set or plurality of rollers 50, the rollers being held enclosed within the motor stator 46. The rotor 48 further may include an inner spline 52 that interacts with a drive link 78 as described in more detail below. The motor portion ultimately drives an output shaft, which is not shown in FIG. 5 but also is described in more detail below.

The outer end of the motor 42 is covered with an end cover 54. To secure the motor to the center section, fasteners 56 extend through the end cover, and through fastening holes 58 in the motor stator. The fasteners further extend though a wear plate 60 and into the fastening receivers 26 referenced above on the motor connection portion 14 of the center section. The wear plate 60 may includes drilled holes or slots 62 through which the fasteners may extend, and the slots 62 further permit fluid flow between the center section and the motor. In this manner, the motor stator 46 is secured to the center section 10 against the motor running face 24 in a manner that permits orbital rotation of the rotor 48 against the rollers 50.

The center section bore hole 25 receives the rotary spool valve 44. In exemplary embodiments, the rotary spool valve 44 includes two internal annular recesses, a first annular recess 64 and a second annular recess 66, which respectively are defined by end portions 68 and 70 and a central metering portion 72. Alternatively, one or more annular recesses maybe be formed in the center section. When received in the center section, the first annular recess 64 is aligned with and in fluid communication with the first internal fluid port 30*a*, and the second annular recess 66 is aligned with and in fluid communication with the second internal fluid port 30*b*. The metering portion 72 includes a plurality of longitudinal slots 74, each longitudinal slot being in fluid communication with one of the annular recesses. The longitudinal slots form fluid pathways for communicating hydraulic fluid between the annular recesses 64 and 66, and the slots 31 (see, e.g., FIG. 4).

As the spool valve rotates under the fluid pressure from the pump, the longitudinal slots are moveable into positions in fluid communication with the motor slots 31 to communicate fluid to and from the motor 42. The longitudinal slots 74 of the spool valve are sized to have a cross-sectional area appropriate for the flow rate from the pump to efficiently supply fluid to the motor, which avoids excessive pressure drop due to flow restriction that otherwise would create heat and waste energy. A retaining ring 76 may be employed to retain the spool valve for prevention of outward longitudinal movement. With such configuration, the spool valve directly engages with the center section on the pump side, which results in a more compact configuration as compared to conventional configurations.

A drive link 78 extends between the motor 42 and the spool valve 44. The drive link 78 includes a first end that has a first spline 80 that extends into the rotor 48. The first spline 80 interacts with an internal spline 52 on the rotor 48. In this manner, the rotor interfaces with the drive link to drive the drive link as the rotor rotates. The drive link has a second end that extends into the spool valve, and the second end of the drive link has a second spline 82 that interfaces internally within the spool valve with a cooperating spline. A second spline in the spool interfaces with a spline on the output shaft (the output drive shaft not shown in FIG. 5). In this manner, the drive link operates to communicate torque from the motor to the output drive shaft.

FIG. 5 further depicts check valves 84a and 84b, which are located in the valve cavities 20a and 20b. Each check valve respectively may include a valve poppet and spring 86a/b and valve cap 88a/b. Locator pins 90a and 90b may fit in respective fastening receivers 22 in the center section, which operate to locate the center section in a top housing during assembly, and other receiving elements in the center section may be employed to secure the center section within the housing.

Referring to FIGS. 1-5, the operation of the center section/motor portion sub-assembly 40 proceeds as follows. In an exemplary forward drive direction, a pump supplies hydraulic fluid into the center section via the first pump kidney port 28a. Fluid flows in a forward or supply flow direction and through the first internal passage 34 to the first internal port 30a. The fluid then enters the first annular recess 64 of the spool valve 44, which pressurizes the spool valve. The pressure forces the fluid further into the metering portion 72, and particularly into the portion of the longitudinal slots 74 in fluid communication with the first annular recess 64. The longitudinal slots 74 are phased angularly such that the first annular recess 64 for supply flow is connected to motor pockets 90 that are increasing in volume, and the second annular recess 66 for return flow is connected to motor pockets 90 that are decreasing in volume (see particularly FIG. 5). The fluid then flows under the pressure through the motor fluid ports 32 of the motor connection portion 14 of the center section, and then through the slots 62 of the wear plate 60 and into the motor pockets as described below.

Referring to the motor 42, the fluid flow from the center section causes the rotor to rotate in an orbital fashion against the rollers 50 within the motor stator 46. The rotor 48 defines a plurality of spaces or motor pockets 90 between the rotor perimeter and the motor stator 46. The motor pockets 90 are in fluid communication with respective motor fluid ports 32 of the center section. The rotor 48 rotates asymmetrically, i.e., in an orbital fashion, against the rollers 50. As a result, as the rotor rotates, the volumes of the plurality of motor pockets 90 sequentially increase and decrease. In particular, volumes of certain of the motor pockets 90 are increasing while volumes of others of the motor pockets 90 are decreasing. Fluid flows into the increasing motor pockets 90, and then is forced out from the decreasing spaces 90, which results in rotation of the rotor 48. The outflow from the decreasing motor spaces flows back into the corresponding fluid ports 32, and then into the spool valve. In particular, within the metering portion 72 of the spool valve 44, a portion of the longitudinal slots 74 are in fluid communication with the second annular recess 66 to provide a return flow into the center section. The return flow proceeds through the second internal port 30b, through the second internal passage 36 and outward to the pump via the second pump kidney port 28b to complete the fluid circuit.

The rotation of the rotor 48 drives the drive link 78 via their cooperating splines. The second spline portion 82 of the drive link in turn cooperates with a first spline in the spool. A second spline in the spool cooperates with an output drive shaft to drive a wheel of the vehicle. The above description pertains to an exemplary forward drive operation, but the vehicle may be operated in reverse, in which case the flow paths and rotations of the various components essentially would operate in the reverse direction relative to the above.

An advantage of this configuration is that overall size of the hydrostatic transmission is reduced. A distance between the pump input shaft and the output shaft of the hydrostatic transmission is reduced in particular. This is significant for zero-turn radius vehicles, in which space is at a premium. The described configuration permits initial installation of the center section/motor portion assembly within the housing. After this initial installation, the output shaft can be installed in the housing as a separate assembly step. Size is reduced in the configuration of the invention by having the spool valve be incorporated into the center section for more direct fluid communication with the pump. The described configuration also prevents large side loads on the wheel hub from being transferred to the spool valve, thereby reducing the wear of the spool bore as compared to conventional configurations.

The center section/motor portion sub-assembly 40 may be incorporated into a top housing to form a hydrostatic transmission. Another aspect of the invention, therefore, is a hydrostatic transmission that includes the sub-assembly 40 described above, enclosed by a housing and in combination with a pump and output shaft. The center section and the motor are configured for the hydraulic separating forces of the motor to be reacted only into the center section, and not the top housing. In exemplary embodiments of the hydrostatic transmission, for installation the output shaft is configured as a separate component from the spool valve of the sub-assembly.

Figure 6:
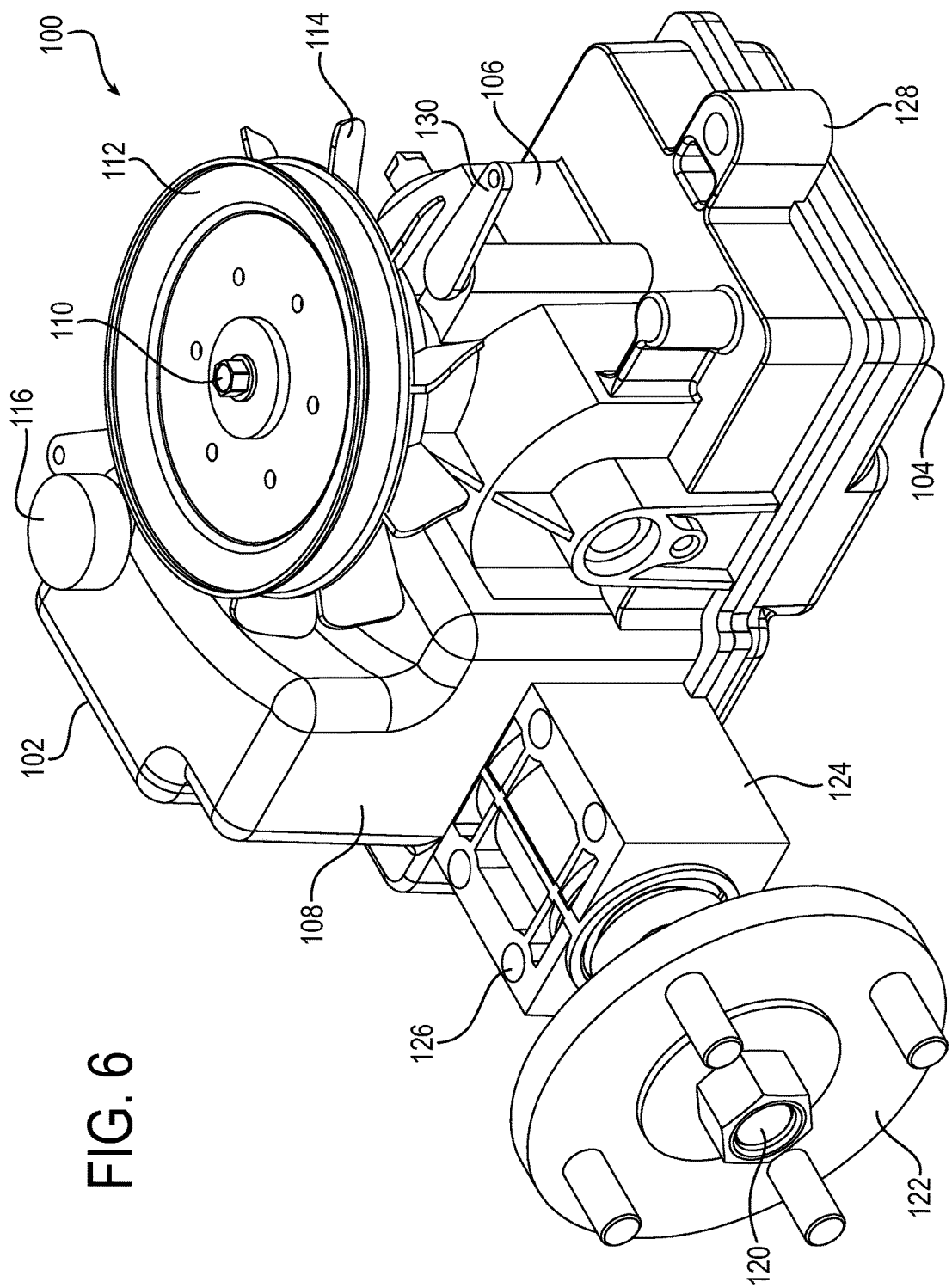
FIG. 6 is a drawing depicting a perspective view of an exemplary hydrostatic transmission in accordance with embodiments of the present invention.
Figure 7:
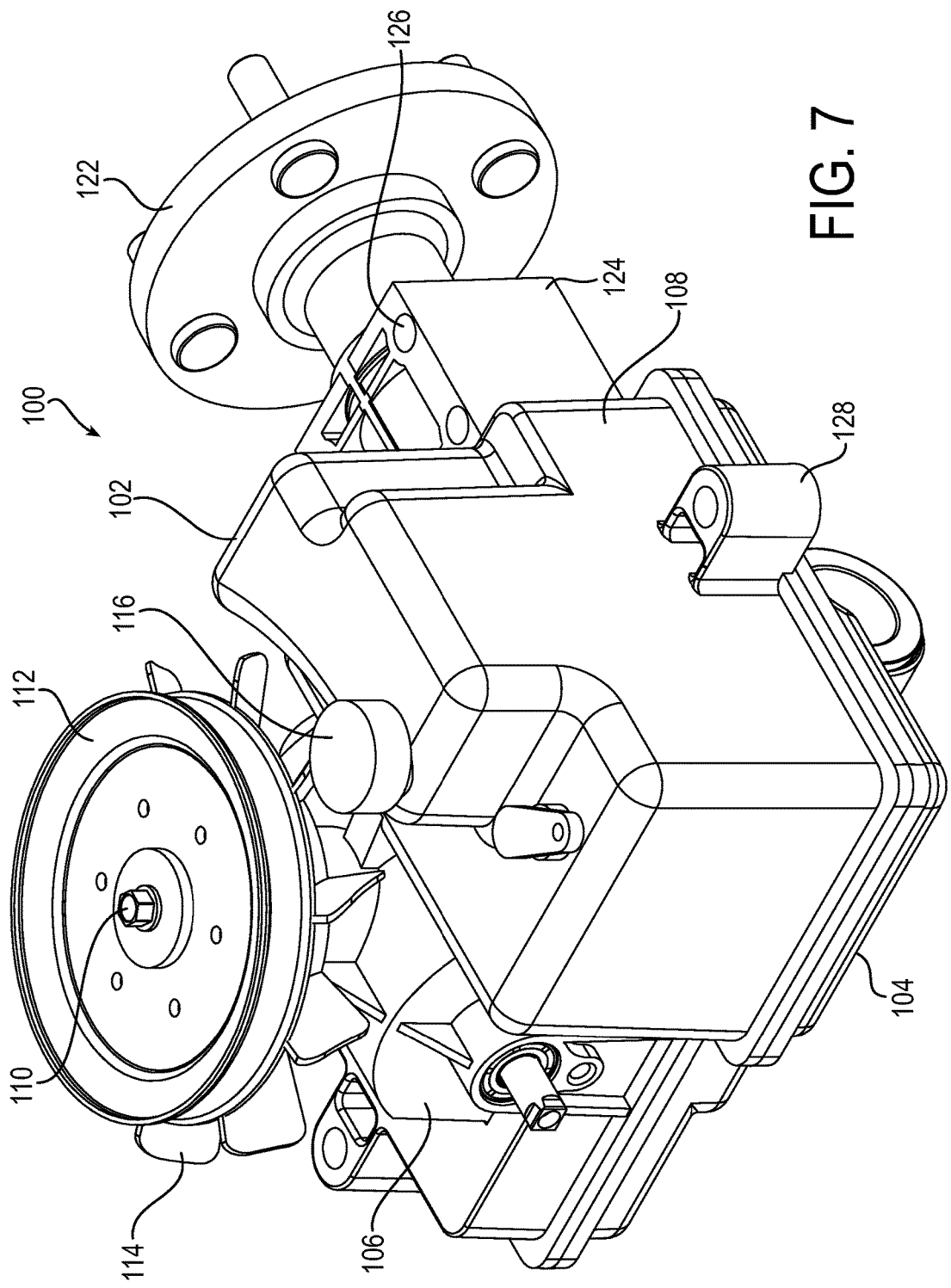
FIG. 7 is a drawing depicting a second perspective view of the exemplary hydrostatic transmission of FIG. 6.

FIGS. 6 and 7 are drawings depicting two perspective views from different viewpoints of an exemplary hydrostatic transmission 100. The hydrostatic transmission 100 includes a top housing 102 fixed to a bottom plate 104. The top housing typically is die cast out of metal, and with the bottom plate 104 forms a housing for enclosing the center section/motor portion sub-assembly 40 described above. The hydrostatic transmission 100 further includes a pump housing portion 106 that encloses the pump components, and a motor housing portion 108 that encloses the motor, although it will be appreciated that the die cast nature of housing 102 results in a continuous component including both housing portions. On the pump housing portion 106, a fastener 110 is coupled to an input shaft of the pump, and the fastener extends outward from the housing. The fastener and attached input shaft may be coupled to an input belt pulley 112, and a fan 114 that operates to provide cooling for the hydrostatic transmission. Enhanced cooling is provided by mounting the fan to the input shaft directly adjacent to the input belt pulley. A breather cap 116 is located on the top of the motor housing portion 108.

FIG. 6 in particular depicts the hydrostatic transmission from the viewpoint of the output shaft and wheel hub side. As seen in such figure, the hydrostatic transmission includes an output shaft 120 coupled to a wheel hub 122. As further seen in FIGS. 6 and 7, on the output shaft side, the housing further may include a housing extension portion 124, and the output shaft extends from the spool valve through the housing extension portion to the wheel hub. The housing extension portion further may include a plurality of fastener holes 126. Fastening brackets 128 also may extend from the housing. The fastener holes 126 and brackets 128 may be employed to secure the transmission to a vehicle. As seen particularly in FIG. 6, on the pump side the hydrostatic transmission may include a bypass lever 130, which can interact with the referenced check valves to short circuit the fluid flow paths. This bypasses the pump to permit the motor's rotor to spin freely. Such bypass operation, for example, would permit a user to push the vehicle in a neutral state.

Figure 8:
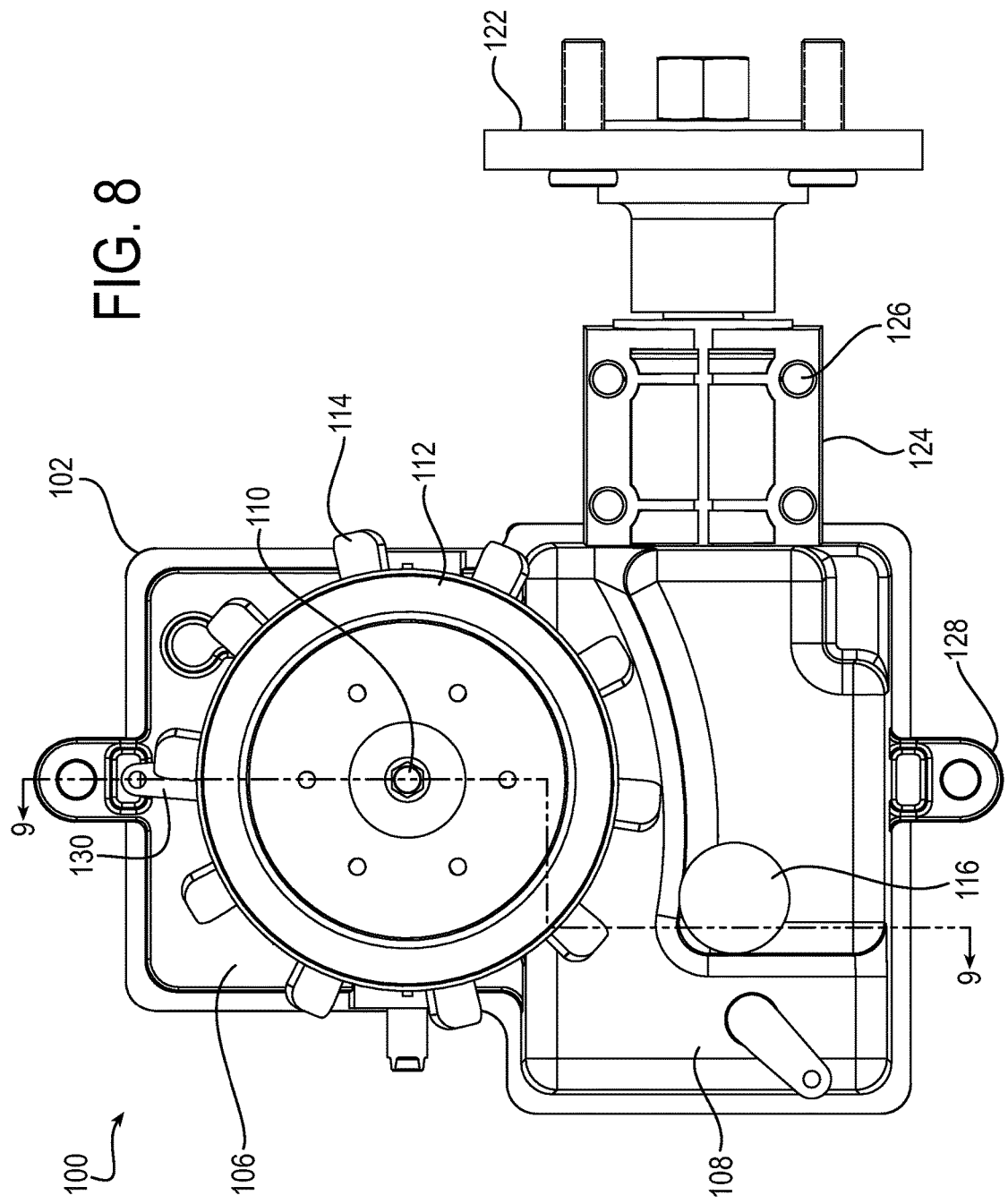
FIG. 8 is a drawing depicting a top view of the exemplary hydrostatic transmission of FIG. 6.

FIG. 8 is a drawing depicting a top view of the exemplary hydrostatic transmission 100. FIG. 8 is utilized as a reference figure for generating a cross-sectional view of the hydrostatic transmission 100. In particular, FIG. 9 is a drawing depicting a cross-sectional view of the hydrostatic transmission along the line 9-9 of FIG. 8.

Figure 9:
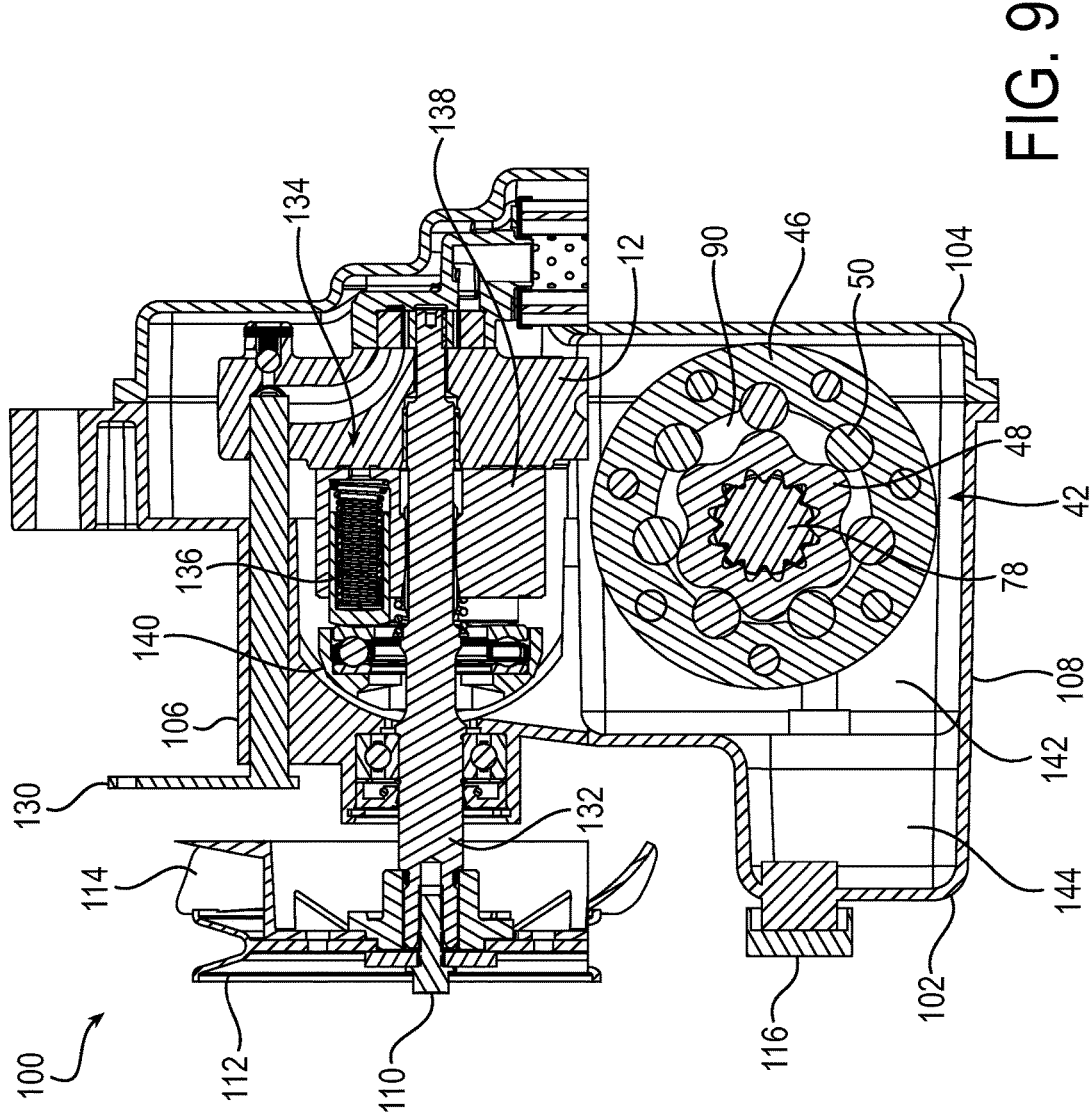
FIG. 9 is a drawing depicting a cross-sectional view of the hydrostatic transmission along the line 9-9 of FIG. 8.

As seen in FIG. 9, the pump portion includes an input shaft 132 that is connected at one end to the fastener 110. The fastener 110 secures the pulley, fan, and pulley hub to the input shaft 132. A piston rotating group 134 includes a plurality of pistons 136 that are supported on a barrel 138. The rotating group is driven by the input shaft 132 and rotates against the pump running face of the center section and adjacent a swash plate 140. In operation, the operator effects control to cause a rotation of the swash plate 140. For example, the swash plate may rotate within a range of ±14°. With the rotation of the swash plate, the pistons extend and contract to drive the hydraulic fluid in and out. The flow is directed through the motor portion to produce a power output via the output drive shaft. On the pump side, FIG. 9 further depicts the bypass lever 130.

The top housing 102 of the hydrostatic transmission encloses a fluid reservoir of hydraulic fluid 142. The top housing 102 may define a sufficient volume in excess of the fluid volume 142 constituting an integral fluid expansion volume 144. The integral fluid expansion volume provides adequate space for the hydraulic fluid to expand during temperature changes, particularly during operation. By providing a reservoir with adequate expansion volume integral in the top housing, the hydraulic fluid of the hydrostatic transmissions for the different wheels is always separate. This configuration has space-saving advantages over conventional configurations that have a common or shared fluid reservoir and expansion volume that accommodates the various wheels. This configuration relatedly eliminates the need for any external expansion reservoir, whether shared or separate for the different wheels, as is required in some conventional configurations.

FIG. 9 further depicts the orbital gerotor configuration of the motor portion 42. As described above, in this exemplary embodiment the motor portion 42 includes a rotor having an orbital gerotor configuration with a rotor 48 that rotates within the motor stator 46 against and relative to the plurality of rollers 50. As referenced above, the motor pockets 90 defined between the rotor 48 and motor stator 46 permit the inflow and force the outflow of the hydraulic fluid to cause rotation of the rotor 48 within the motor stator. Splines of the rotor 48 interact with the splines of the drive link 78 such that the rotation of the rotor 48 drives the rotation of the drive link.

Figure 10:
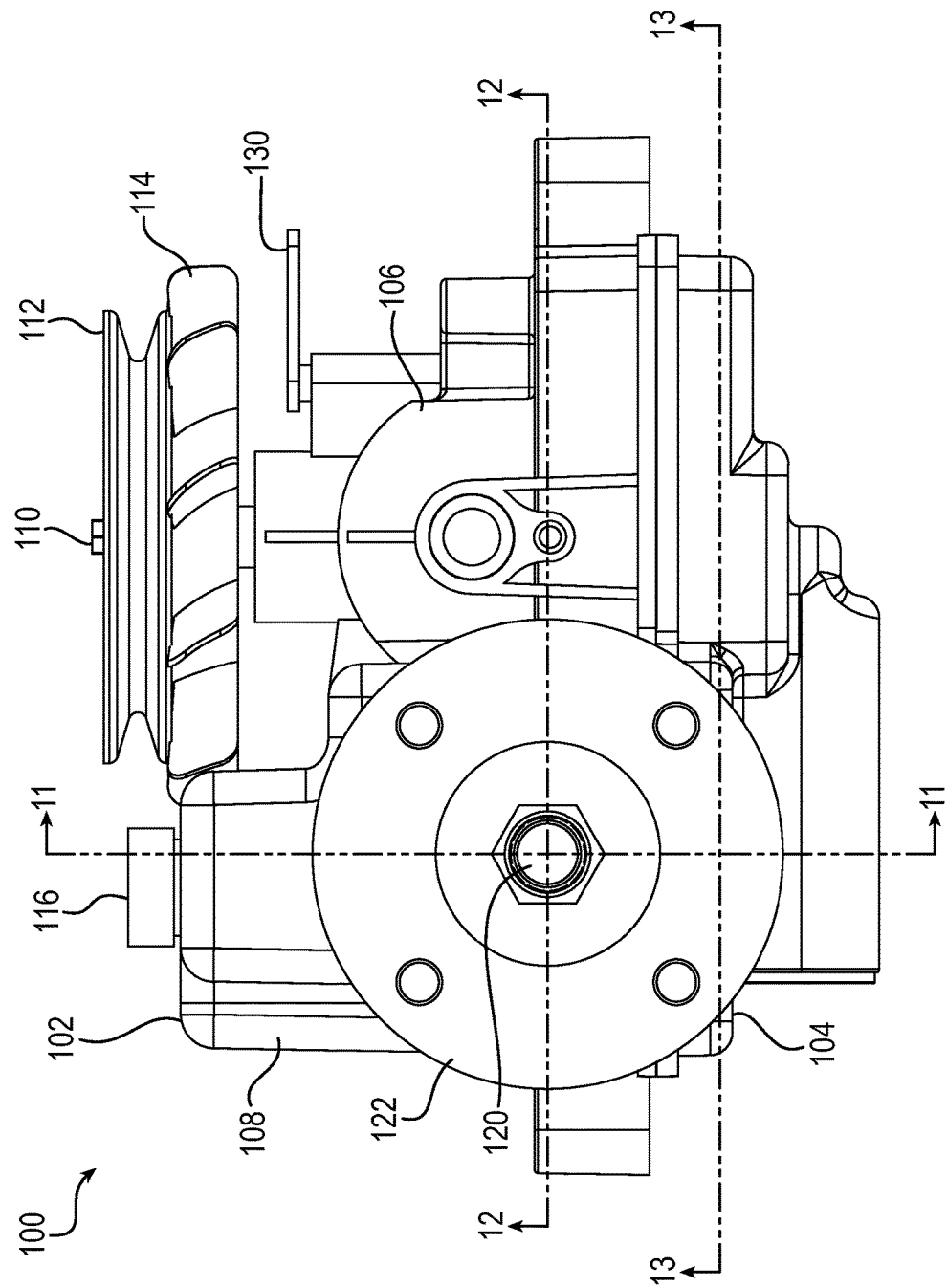
FIG. 10 is a drawing depicting a side view on the wheel hub side of the exemplary hydrostatic transmission of FIG. 6.
Figure 11:
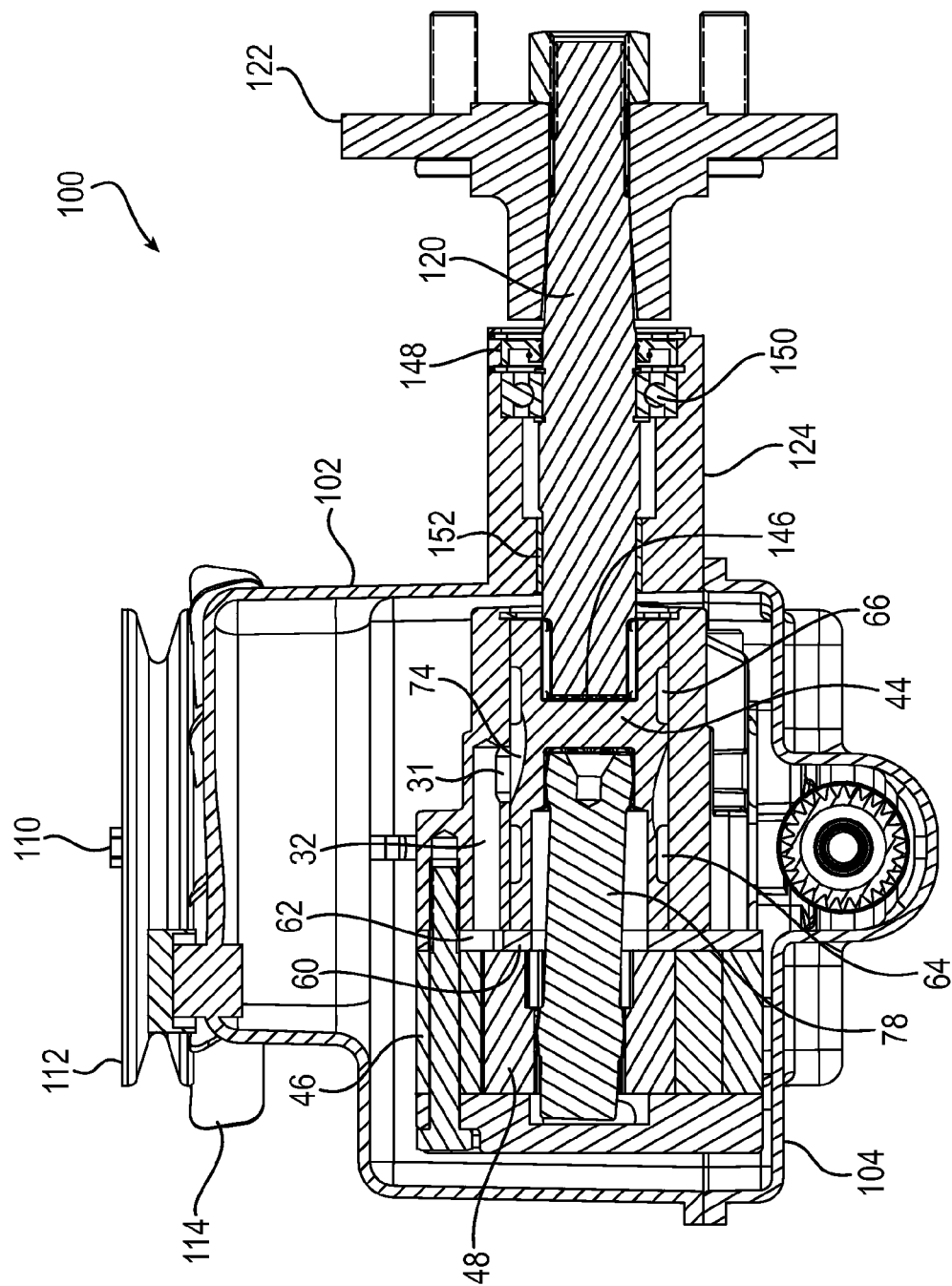
FIG. 11 is a drawing depicting a cross-sectional view of the hydrostatic transmission along the line 11-11 of FIG. 10.
Figure 12:
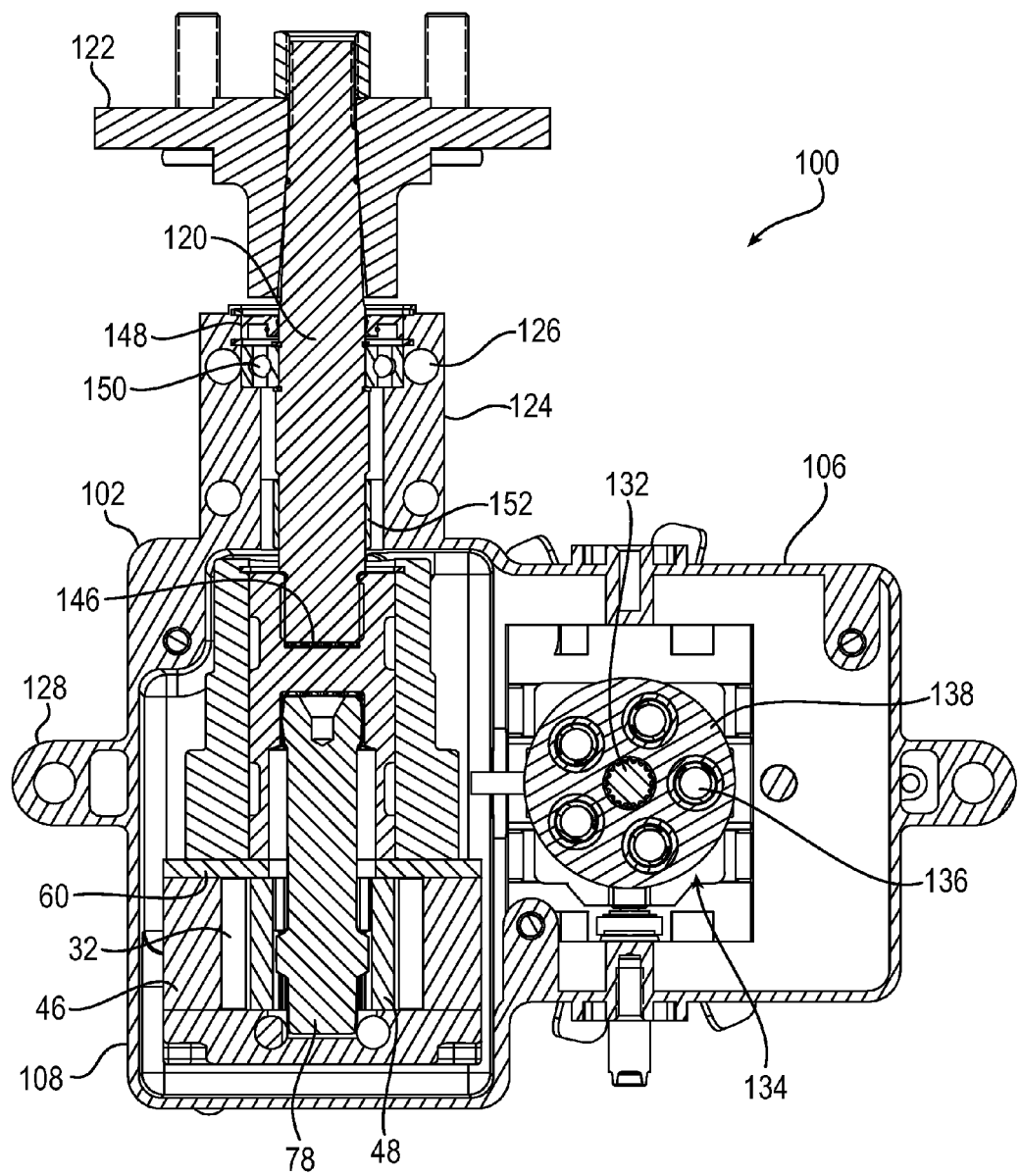
FIG. 12 is a drawing depicting a cross-sectional view of the hydrostatic transmission along the line 12-12 of FIG. 10.
Figure 13:
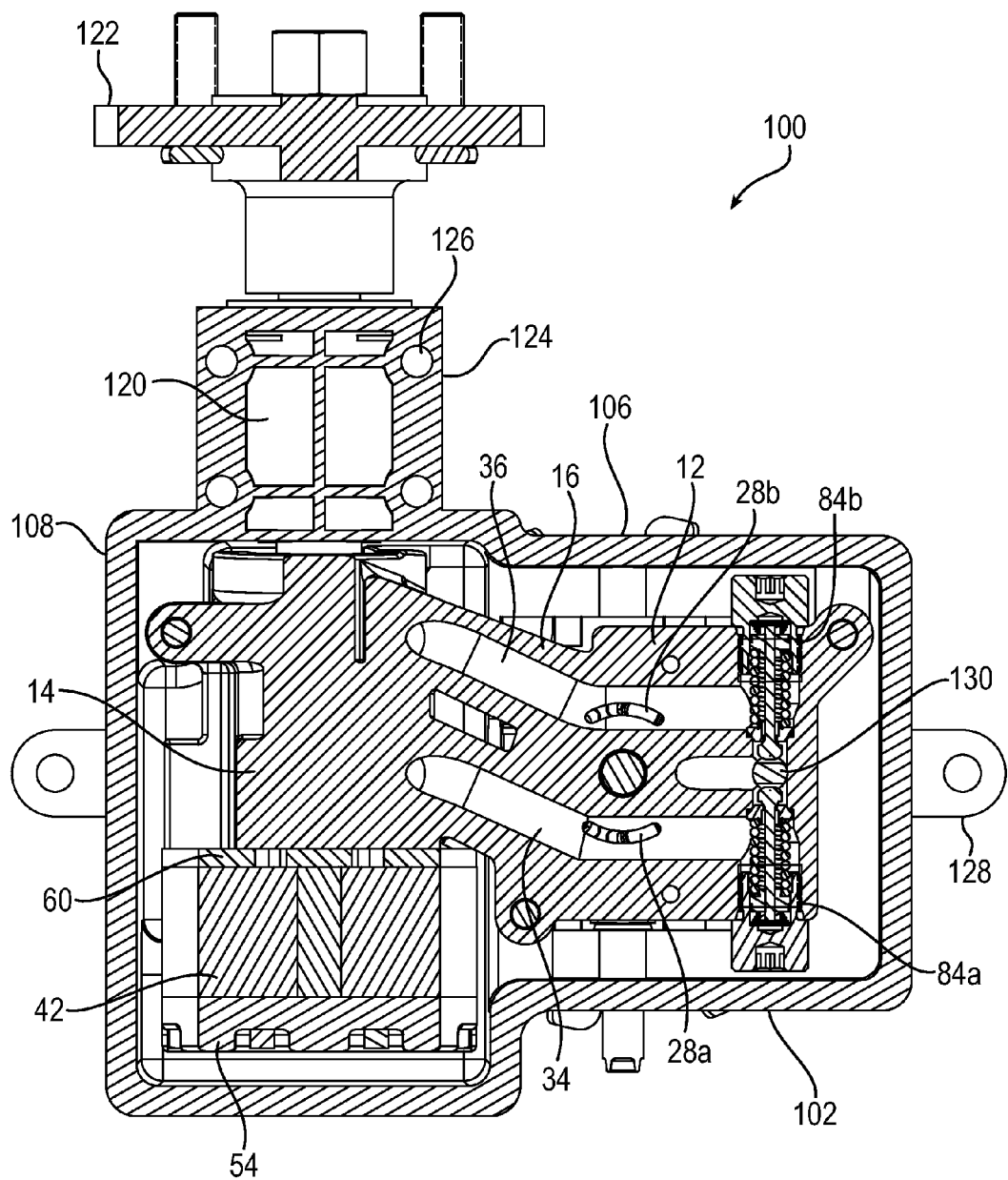
FIG. 13 is a drawing depicting a bottom cross-sectional view of the exemplary right side hydrostatic transmission along the line 13-13 of FIG. 10.

FIG. 10 is a drawing depicting a side view on the output shaft or wheel hub side of the exemplary hydrostatic transmission 100. FIG. 10 is utilized as a reference figure for generating additional cross-sectional views of the hydrostatic transmission 100. In particular, FIG. 11 is a drawing depicting a cross-sectional view of the hydrostatic transmission along the line 11-11 of FIG. 10. FIG. 12 is a drawing depicting a cross-sectional view of the hydrostatic transmission along the line 12-12 of FIG. 10. FIG. 13 is a drawing depicting a bottom cross-sectional view of the hydrostatic transmission along the line 13-13 of FIG. 10.

FIGS. 11 and 12 show the various components described above from additional viewpoints. Of note, FIGS. 11 and 12 provide additional cross-sectional views of the output shaft components as installed within the hydrostatic transmission 100. The output shaft 120 is positioned at a first end 146 through the rotary spool valve 44, such that the drive link 78 interacts with the output shaft 120 within the spool valve 44. As reference above, the spool valve 44 is configured as a separate component from the output shaft 120 to reduce the negative effects of side loads.

As seen particularly in FIG. 11, the drive link preferably is slightly angled relative to a longitudinal axis of the output shaft 120. For example, the angle may be approximately two degrees. To accommodate the angular orientation, the splines of the drive link 78 may be crowned. Within the housing extension portion 124, an output shaft seal 148 and bearing 150 may be provided to support and seal the output shaft 120. An additional bushing 152 may be provided to support the output shaft 120 adjacent to where the housing extension portion 124 joins with the remainder of the housing 102. FIG. 12 provides an additional view of the manner of configuration of the piston rotating group 134, including the pistons 136 supported by the barrel 138.

FIG. 13 is a drawing depicting a bottom cross-sectional view of the exemplary hydrostatic transmission 100. FIG. 13 shows a view of the configuration of the fluid passages through the center section, comparably as in FIG. 4, with like components being identified with common reference numerals. As described above, in an exemplary forward or supply flow direction, the pump supplies hydraulic fluid into the center section via the first pump kidney port 28a at the pump interfacing portion 12 of the center section. Fluid flows in the supply flow direction through the first internal passage 34 in the manifold 16 to the motor connection portion 14 of the center section, and ultimately to the motor 42. In the return flow, fluid flows back from the motor 42 into the center section, and through the second internal passage 36 to the second pump kidney port 28b. In an exemplary reverse flow direction, the fluid flow would proceed essentially opposite to that described above.

FIG. 13 further depicts the positioning of a bottom end of the bypass lever 130, which engages the check valves 84a and 84b to short circuit the fluid flow in the hydrostatic transmission as described above. Again, such operation bypasses the pump so the rotor may turn freely, in the event an operator may wish to push the vehicle.

An aspect of the invention, therefore, is a center section/motor sub-assembly for use in a hydrostatic transmission. In exemplary embodiments, the center section/motor sub-assembly includes a center section having a pump running face for interfacing with a pump and a motor running face for interfacing with a motor, and a bore extending laterally through the center section from the motor running face. A spool valve is received in the bore and includes a fluid pathway for providing fluid communication between the pump running face and the motor running face. The motor includes a motor stator and a rotor, wherein the motor stator is secured to the center section adjacent to the motor running face in a manner that permits rotation of the rotor. The center section is configured as a porting manifold for communicating hydraulic fluid from the pump running face through the spool valve to the motor, and configured for the hydraulic separating forces of the motor to be reacted only into the center section.

In an exemplary embodiment of the center section/motor sub-assembly, the porting manifold includes first and second kidney ports on the pump running face for interfacing with the pump, first and second internal fluid ports in fluid communication with the bore, and first and second internal passages that form fluid pathways respectively between the first and second kidney ports and the first and second internal fluid ports.

In an exemplary embodiment of the center section/motor sub-assembly, the spool valve includes a first annular recess in fluid communication with the first internal fluid port, a second annular recess in fluid communication with the second internal fluid port, and a plurality of longitudinal slots, each longitudinal slot being in fluid communication with one of the annular recesses, wherein the longitudinal slots form fluid pathways for communicating hydraulic fluid between the spool valve and the motor.

In an exemplary embodiment of the center section/motor sub-assembly, the first kidney port, first internal passage, first internal fluid port, first annular recess, and a portion of the longitudinal slots form a forward flow fluid pathway for communicating hydraulic fluid through the center section to the motor. The second kidney port, second internal passage, second internal fluid port, second annular recess, and a portion of the longitudinal slots form a return flow fluid pathway for communicating hydraulic fluid from the motor through the center section.

In an exemplary embodiment of the center section/motor sub-assembly, the first and second internal passages run parallel to each other as they rise in elevation between the pump kidney ports and the internal fluid ports.

In exemplary embodiment of the center section/motor sub-assembly, the pump running face is oriented 90° relative to the motor running face.

In an exemplary embodiment of the center section/motor sub-assembly, the motor has a gerotor configuration in which the rotor rotates in an orbital fashion against a plurality of rollers.

In an exemplary embodiment of the center section/motor sub-assembly, the rotor and the motor stator define a plurality of pockets in which the volume sequentially increases and decreases as the rotor rotates, the pockets receiving hydraulic fluid when increasing and forcing hydraulic fluid out of the motor when decreasing.

In an exemplary embodiment of the center section/motor sub-assembly, the sub-assembly further includes a drive link having a first end, wherein the first end of the drive link extends into the rotor, and the rotor interfaces with the drive link to drive the drive link as the rotor rotates.

In an exemplary embodiment of the center section/motor sub-assembly, the drive link has a second end that extends into the spool valve, and the second end of the spool valve interfaces with an output shaft to communicate torque from the motor to the output shaft.

Another aspect of the invention is a hydrostatic transmission. In exemplary embodiments, the hydrostatic transmission includes a center section having a pump running face for interfacing with a pump and a motor running face for interfacing with a motor, and a bore extending laterally through the center section from the motor running face. A spool valve is received in the bore and including a fluid pathway for providing fluid communication between the pump running face and the motor running face. A pump interfaces with the center section against the pump running face. A motor includes a motor stator and a rotor, wherein the motor stator is secured to the center section adjacent to the motor running face in a manner that permits rotation of the rotor. A top housing encloses the center section, spool valve, pump, and motor. The center section is configured as a porting manifold for communicating hydraulic fluid from the pump running face through the spool valve to the motor, and configured for the hydraulic separating forces of the motor to be reacted only into the center section and not the top housing.

In an exemplary embodiment of hydrostatic transmission, the center section further includes first and second kidney ports on the pump running face for interfacing with the pump, first and second internal fluid ports in fluid communication with the bore, and first and second internal passages that form fluid pathways respectively between the first and second kidney ports and the first and second internal fluid ports.

In an exemplary embodiment of hydrostatic transmission, the spool valve includes a first annular recess in fluid communication with the first internal fluid port, a second annular recess in fluid communication with the second internal fluid port, and a plurality of longitudinal slots, each longitudinal slot being in fluid communication with one of the annular recesses, wherein the longitudinal slots form fluid pathways for communicating hydraulic fluid between the spool valve and the motor.

In an exemplary embodiment of hydrostatic transmission, the first kidney port, first internal passage, first internal fluid port, first annular recess, and a portion of the longitudinal slots form a forward flow fluid pathway for communicating hydraulic fluid through the center section to the motor. The second kidney port, second internal passage, second internal fluid port, second annular recess, and a portion of the longitudinal slots form a return flow fluid pathway for communicating hydraulic fluid from the motor through the center section.

In an exemplary embodiment of hydrostatic transmission, the first and second internal passages run parallel to each other as they rise in elevation between the pump kidney ports and the internal fluid ports.

In an exemplary embodiment of hydrostatic transmission, the pump running face is oriented 90° relative to the motor running face.

In an exemplary embodiment of hydrostatic transmission, the motor has a gerotor configuration in which the rotor rotates in an orbital fashion against a plurality of rollers.

In an exemplary embodiment of hydrostatic transmission, the rotor and the motor stator define a plurality of pockets of volume that sequentially increases and decreases as the rotor rotates, the pockets receiving hydraulic fluid when increasing and forcing hydraulic fluid out of the motor when decreasing.

In an exemplary embodiment of hydrostatic transmission, the hydrostatic transmission further includes a drive link having a first end, wherein the first end of the drive link extends into the rotor, and the rotor interfaces with the drive link to drive the drive link as the rotor rotates.

In an exemplary embodiment of hydrostatic transmission, the hydrostatic transmission further includes an output shaft having an end that extends into the spool valve. The drive link has a second end that extends into the spool valve, and the second end interfaces with the end of the output shaft to communicate torque from the motor to the output shaft.

In an exemplary embodiment of hydrostatic transmission, the top housing has an extension portion, and the output shaft extends from the spool valve through the extension portion of the housing.

In an exemplary embodiment of hydrostatic transmission, the hydrostatic transmission further includes a shaft seal and a bearing set located in the housing extension portion for supporting and sealing the output shaft.

In an exemplary embodiment of hydrostatic transmission, the drive link is angled relative to a longitudinal axis of the output shaft.

In an exemplary embodiment of hydrostatic transmission, the spool valve is configured as a separate component from the output shaft.

In an exemplary embodiment of hydrostatic transmission, the hydrostatic transmission further includes a fluid reservoir within the top housing, wherein the top housing has an integral expansion volume into which the fluid in the reservoir can expand.

In an exemplary embodiment of hydrostatic transmission, the center section further comprises valve cavities for receiving hydraulic fluid, and each valve cavity has a check valve for controlling the flow of hydraulic fluid.

In an exemplary embodiment of hydrostatic transmission, the hydrostatic transmission further includes a bypass lever for interacting with the check valves for shorting the flow of hydraulic fluid.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A center section/motor sub-assembly for use in a hydrostatic transmission, the sub-assembly comprising:
   a center section having a pump running face for interfacing with a pump and a motor running face for interfacing with a motor, and a bore extending laterally through the center section from the motor running face;
   a spool valve received in the bore and including a fluid pathway for providing fluid communication between the pump running face and the motor running face; and
   a motor including a motor stator and a rotor, wherein the motor stator is secured to the center section adjacent to the motor running face in a manner that permits rotation of the rotor, the spool valve being rotationally driven by the rotor via a splined connection;
   wherein the center section is configured as a porting manifold for communicating hydraulic fluid from the pump running face through the spool valve to the motor, and configured for the hydraulic separating forces of the motor to be reacted only into the center section.

2. The center section/motor sub-assembly of claim 1, wherein the porting manifold comprises:
   first and second kidney ports on the pump running face for interfacing with the pump;
   first and second internal fluid ports in fluid communication with the bore; and
   first and second internal passages that form fluid pathways respectively between the first and second kidney ports and the first and second internal fluid ports.

3. The center section/motor sub-assembly of claim 2, wherein the spool valve comprises:
   a first annular recess in fluid communication with the first internal fluid port;
   a second annular recess in fluid communication with the second internal fluid port; and
   a plurality of longitudinal slots, each longitudinal slot being in fluid communication with one of the annular recesses, wherein the longitudinal slots form fluid pathways for communicating hydraulic fluid between the spool valve and the motor.

4. The center section/motor sub-assembly of claim 3, wherein:
   the first kidney port, first internal passage, first internal fluid port, first annular recess, and a portion of the longitudinal slots form a supply flow fluid pathway for communicating hydraulic fluid through the center section to the motor; and
   the second kidney port, second internal passage, second internal fluid port, second annular recess, and a portion of the longitudinal slots form a return flow fluid pathway for communicating hydraulic fluid from the motor through the center section.

5. The center section/motor sub-assembly of claim 2, wherein the first and second internal passages run parallel to each other as they rise in elevation between the pump kidney ports and the internal fluid ports.

6. The center section/motor sub-assembly of claim 1, wherein the pump running face is oriented 90° relative to the motor running face.

7. The center section/motor sub-assembly of claim 1, wherein the motor has a gerotor configuration in which the rotor rotates in an orbital fashion against a plurality of rollers.

8. The center section/motor sub-assembly of claim 7, wherein the rotor and the motor stator define a plurality of pockets of volume that sequentially increases and decreases as the rotor rotates, the pockets receiving hydraulic fluid when increasing and forcing hydraulic fluid out of the motor when decreasing.

9. The center section/motor sub-assembly of claim 7, further comprising a drive link having a first end, wherein the first end of the drive link extends into the rotor, and the rotor interfaces with the drive link to drive the drive link as the rotor rotates.

10. The center section/motor sub-assembly of claim 9, wherein the drive link has a second end that extends into the spool valve, and the second end interfaces with an output shaft to communicate torque from the motor to the output shaft.

11. A hydrostatic transmission comprising:
   a center section having a pump running face for interfacing with a pump and a motor running face for interfacing with a motor, and a bore extending laterally through the center section from the motor running face;
   a spool valve received in the bore and including a fluid pathway for providing fluid communication between the pump running face and the motor running face;
   a pump that interfaces with the center section against the pump running face;
   a motor including a motor stator and a rotor, wherein the motor stator is secured to the center section adjacent to the motor running face in a manner that permits rotation of the rotor, the spool valve being rotationally driven by the rotor via a splined connection; and a top housing that encloses the center section, spool valve, pump, and motor;

wherein the center section is configured as a porting manifold for communicating hydraulic fluid from the pump running face through the spool valve to the motor, and configured for the hydraulic separating forces of the motor to be reacted only into the center section and not the top housing.

12. The hydrostatic transmission of claim 11, wherein the center section further comprises:

first and second kidney ports on the pump running face for interfacing with the pump;

first and second internal fluid ports in fluid communication with the bore; and first and second internal passages that form fluid pathways respectively between the first and second kidney ports and the first and second internal fluid ports.

13. The hydrostatic transmission of claim 12, wherein the spool valve comprises:

a first annular recess in fluid communication with the first internal fluid port;

a second annular recess in fluid communication with the second internal fluid port; and a plurality of longitudinal slots, each longitudinal slot being in fluid communication with one of the annular recesses, wherein the longitudinal slots form fluid pathways for communicating hydraulic fluid between the spool valve and the motor.

14. The hydrostatic transmission of claim 13, wherein:

the first kidney port, first internal passage, first internal fluid port, first annular recess, and a portion of the longitudinal slots form a supply flow fluid pathway for communicating hydraulic fluid through the center section to the motor; and the second kidney port, second internal passage, second internal fluid port, second annular recess, and a portion of the longitudinal slots form a return flow fluid pathway for communicating hydraulic fluid from the motor through the center section.

15. The hydrostatic transmission of claim 12, wherein the first and second internal passages run parallel to each other as they rise in elevation between the pump kidney ports and the internal fluid ports.

16. The hydrostatic transmission of claim 11, wherein the pump running face is oriented 90° relative to the motor running face.

17. The hydrostatic transmission of claim 11, wherein the motor has a gerotor configuration in which the rotor rotates in an orbital fashion against a plurality of rollers.

18. The hydrostatic transmission of claim 17, wherein the rotor and the motor stator define a plurality of pockets of volume that sequentially increases and decreases as the rotor rotates, the pockets receiving hydraulic fluid when increasing and forcing hydraulic fluid out of the motor when decreasing.

19. The hydrostatic transmission of claim 17, further comprising a drive link having a first end, wherein the first end of the drive link extends into the rotor, and the rotor interfaces with the drive link to drive the drive link as the rotor rotates.

20. The hydrostatic transmission of claim 19, further comprising an output shaft having an end that extends into the spool valve, wherein the drive link has a second end that extends into the spool valve, and the second end interfaces with the end of the output shaft to communicate torque from the motor to the output shaft.

* * * * *